(12) United States Patent
Sawai et al.

(10) Patent No.: US 6,866,217 B2
(45) Date of Patent: Mar. 15, 2005

(54) IDLER MECHANISM FOR MAGNETIC TAPE DEVICE AND TAPE DEVICE

(75) Inventors: Kunio Sawai, Osaka (JP); Daisuke Takasaka, Osaka (JP)

(73) Assignee: Funai Electric Co., Ltd. (JP)

( * ) Notice: Subject to any disclaimer, the term of this patent is extended or adjusted under 35 U.S.C. 154(b) by 10 days.

(21) Appl. No.: 10/304,258

(22) Filed: Nov. 26, 2002

(65) Prior Publication Data

US 2003/0098376 A1 May 29, 2003

(30) Foreign Application Priority Data

Nov. 28, 2001 (JP) .................................. 2001-007748 U

(51) Int. Cl.⁷ .............................................. G11B 15/32
(52) U.S. Cl. .................... 242/356; 242/356.3; 360/96.3
(58) Field of Search ............................ 242/356, 356.3; 360/96.3, 96.4

(56) References Cited

U.S. PATENT DOCUMENTS

| | | | | |
|---|---|---|---|---|
| 4,760,751 A | * | 8/1988 | Kasamatsu | 74/354 |
| 5,251,845 A | * | 10/1993 | Ryu | 242/356.3 |
| 5,499,777 A | * | 3/1996 | Ahn | 242/356 |
| 5,669,567 A | * | 9/1997 | Chiu | 242/355 |
| 5,704,563 A | * | 1/1998 | Choi | 242/356 |
| 5,863,008 A | * | 1/1999 | Park | 242/356 |

FOREIGN PATENT DOCUMENTS

| | | | |
|---|---|---|---|
| JP | 57-100646 | 6/1982 | ............ G11B/15/44 |
| JP | 61-163354 | 10/1986 | ............ G11B/15/44 |

OTHER PUBLICATIONS

Patent Abstract: Japanese Patent No. JP57100646, published Jun. 22, 1982, "Reel Driving Method of Tape Recorder", 1 page.

"Concise Statement of Relevancy Between the Invention and Materials", 1 page.

* cited by examiner

Primary Examiner—Eileen D. Lillis
Assistant Examiner—Evan Langdon
(74) Attorney, Agent, or Firm—Osha & May L.L.P.

(57) ABSTRACT

An idler mechanism for a magnetic tape device. An idler gear is swingingly displaced between first and second positions to selectively transmit rotation to one of a pair of reels. One end of an arm-like swinging member is coupled in a relatively rotatable manner to a center shaft of an input gear which always meshes with the idler gear and which is rotated forwardly and reversely. A shaft which is disposed on the other end of the swinging member is inserted in a relatively rotatable manner into a bearing hole of the idler gear. A surface of a flange which is disposed on the input gear is formed as a friction force applying face which extends radially outwardly so as to be inclined downwardly. An outer peripheral portion of the idler gear slidably comes into contact with the friction force applying face.

9 Claims, 4 Drawing Sheets

IDLER MECHANISM FOR MAGNETIC TAPE DEVICE AND TAPE DEVICE

BACKGROUND OF THE INVENTION

1. Field of the Invention

The present invention relates to an idler mechanism for a magnetic tape device, particularly to an idler mechanism for a magnetic tape device in which an idler gear is swingingly displaced by using a frictional resistance.

2. Description of the Related Art

A tape device such as a magnetic recording and reproducing device has a pair of reels to which a supply tape reel and take-up tape reel housed in a tape cassette are respectively attached. The reels rotate the tape reels in a forward direction and a reverse direction. An idler mechanism is used for switching over the rotational direction of the reels.

FIG. 3 is a partially cutaway schematic side view of a conventional idler mechanism. In this type, an idler gear is swingingly displaced between a first position where rotation is transmitted to one of reels, and a second position where rotation is transmitted to the other reel.

In FIG. 3, 1 denotes an idler gear, and 2 denotes an input gear which always meshes with the idler gear 1 and is rotated in forward and reverse directions. An arm-like swinging member 3 is disposed on the gears 1 and 2. One end of the swinging member 3 is coupled in a relatively rotatable manner to a center shaft 21 of the input gear 2. A shaft hole 31 is formed in the other end of the swinging member 3. The idler gear 1 is rotatably attached to a shaft 4 which is inserted into the shaft hole 31. A spring 5 for urging the idler gear 1 toward the swinging member 3 is interposed between a spring bracket 41 disposed on the shaft 4 and the idler gear 1.

In the idler mechanism, when the input gear 2 is rotated, the idler gear 1 is rotated in the direction which is opposite to the rotational direction of the input gear 2. Since the idler gear 1 is urged toward the swinging member 3 by the spring 5, a frictional resistance is generated in an overlapping region "a" between the idler gear 1 and the swinging member 3. In a meshing region "b" between the input gear 2 and the idler gear 1, therefore, a rotational torque which causes the idler gear 1 to swing about the center shaft 21 of the input gear 2 is generated. The idler gear 1 is swingingly displaced about the center shaft 21 by the rotational torque. When the rotational direction of the input gear 2 is switched over to the forward or reverse direction, the idler gear 1 is swingingly displaced between a first position where rotation is transmitted to one of reels, and a second position where rotation is transmitted to the other reel.

JP-A-57-100646 discloses an idler mechanism shown in FIGS. 4 and 5. An idler gear is swingingly displaced between first and second positions without using the spring 5 shown in FIG. 3.

The idler mechanism shown in FIGS. 4 and 5 is used for driving reels of a tape recorder. A center portion of a support lever 93 is coupled in a relatively rotatable manner to a capstan shaft 90 to which a capstan gear 91 is fixed. A pair of idler gears 94 and 95, which always mesh with the capstan gear 91, are rotatably supported by shafts 96 and 97 that are attached to both ends of the support lever 93 respectively. The lower ends of the shafts 96 and 97 are placed on the upper face of a flywheel 98 which is fixed to the capstan shaft 90.

When the capstan gear 91 is rotated, the capstan shaft 90 and the flywheel 98 are rotated together, and hence the shafts 96 and 97 which are placed on the upper face of the flywheel 98 are displaced together with the idler gears 94 and 95 about the capstan shaft 90 by the flywheel 98. When the rotational direction of the capstan gear 91 is switched over to the forward or reverse direction, the idler gears 94 and 95 are swingingly displaced between a first position where rotation is transmitted to one of reels, and a second position where rotation is transmitted to the other reel. In the first position, the idler gear 94 meshes with a reel gear 92 which rotates the one reel 92a. In the second position, the idler gear 95 meshes with a reel gear 99 which rotates the other reel 99a.

In the conventional structure described with reference to FIG. 3, a frictional resistance is generated by urging the idler gear 1 toward the swinging member 3 by the spring 5, and a rotational torque which causes the idler gear 1 to swing is generated by the frictional resistance. Therefore, the spring 5 is inevitably used for swingingly displacing the idler gear 1 between the first and second positions. This causes problems in that the number of parts is increased, that the assembly process becomes cumbersome, and that the cost is raised. As shown in FIG. 3, the shaft 4 is additionally required for attaching the idler gear 1 and the swinging member 3, thereby causing a further problem in that the cost is correspondingly increased.

By contrast, in the configuration described with reference to FIGS. 4 and 5, no spring is used, and hence the number of parts can be correspondingly reduced. In the configuration, however, under the state where the idler gears are located in the first or second position to mesh with the reel gear 92 or 99, the upper face of the flywheel 98 rubs with the lower ends of the shafts 96 and 97 because the shafts 96 and 97 are held to given positions but the flywheel 98 is rotated together with the capstan shaft 90. Therefore, the lower ends of the shafts 96 and 97, or the upper face of the flywheel 98 easily wears, and there arises the possibility that the performance stability of the idler mechanism is impaired by the wear.

SUMMARY OF THE INVENTION

It is an object of the present invention to provide an idler mechanism for a magnetic tape device in which the spring described with reference to FIG. 3 is not required.

It is another object of the present invention to provide an idler mechanism for a magnetic tape device in which an initial performance stability can be maintained for a long time period.

It is a further object of the present invention to provide an idler mechanism for a magnetic tape device in which not only the spring, but also the shaft used for coupling the swinging member with the idler gear described with reference to FIG. 3, are not required.

According to an aspect of the present invention, there is provided an idler mechanism for a magnetic tape device in which an idler gear is swingingly displaced between first and second positions to selectively transmit rotation to one of a pair of reels, wherein a swinging member is coupled in a relatively rotatable manner to the idler gear, and also to an input gear which always meshes with the idler gear and which is rotated forwardly and reversely, a friction force applying face is concentrically formed on one of the idler gear and the input gear, and the other one of the idler gear and the input gear slidably comes into contact with the friction force applying face.

According to the configuration, the friction force applying face is concentrically formed on one of the input gear and the idler gear which always mesh with each other, and the other one of the gears slidably comes into contact with the friction force applying face, so that a rotational torque of the idler gear is generated by a frictional resistance of the contacting part. Therefore, it is not required to use the spring described with reference to FIG. 3.

Preferably, the friction force applying face is formed by a surface of a flange which is integrally formed on the one gear, and an outer peripheral portion of the other gear slidably comes into contact with the friction force applying face. According to the configuration, it is not required to use the flywheel described with reference to FIG. 5, and hence the number of parts is reduced.

Preferably, the surface of the flange extends radially outwardly so as to be inclined downwardly. According to the configuration, the friction force applying face which is formed by the outward and downward inclined surface of the flange comes into point contact or line contact with the outer peripheral portion of the gear. Therefore, a situation in which the frictional resistance of the contacting part is unduly increased and an excessively large load is applied to the input gear does not occur.

Preferably, the swinging member comprises a shaft which is inserted in a relatively rotatable manner into a bearing hole that is formed in the other gear, the one gear comprises a flange projecting from a periphery thereof, and the other gear is held in a space between the friction force applying face formed by the surface of the flange and the swinging member. According to the configuration, it is possible to use the shaft of the swinging member instead of the shaft member described with reference to FIG. 3, and hence the shaft member is not necessary. Thus, the number of parts is decreased. Since the idler gear is held in the space between the friction force applying face and the swinging member, it is not necessary to provide the shaft with a portion for preventing the idler gear from slipping off. This is useful for simplifying the shapes of the shaft and the swinging member having the shaft to suppress the production cost.

According to an aspect of the present invention, there is provided an idler mechanism for a magnetic tape device in which an idler gear is swingingly displaced between first and second positions to selectively transmit rotation to one of a pair of reels, one end of an arm-like swinging member is coupled in a relatively rotatable manner to a center shaft of an input gear which always meshes with the idler gear and which is rotated forwardly and reversely, a shaft which is integrally disposed on the other end of the swinging member is inserted in a relatively rotatable manner into a bearing hole that is formed in the idler gear, a friction force applying face which extends radially outwardly so as to be inclined downwardly is formed by a surface of a flange which is formed on the input gear to project from a periphery of the input gear, and an outer peripheral portion of the idler gear that is held in a space between the friction force applying face and the swinging member slidably comes into contact with the friction force applying face in a part where the input gear meshes with the idler gear.

According to the configuration, the outer peripheral portion of the idler gear which is placed in the first or second position comes into contact with the friction force applying face of the input gear in the part where the idler gear meshes with the input gear. Therefore, a state is obtained in which the outer peripheral portion of the idler gear that is rotated in the same direction as the friction force applying face is in contact with the friction force applying face that is rotated together with the input gear. Consequently, the degree of rubbing between the friction force applying face and the outer peripheral portion of the idler gear is lower than that obtained in the situation described with reference to FIG. 5, i.e., in the case where the upper face of the rotated flywheel 98 rubs with the shafts 96 and 97 that are stopped. Thus, wear does not occur. Moreover, rotation of the friction force applying face is transmitted to the idler gear. Therefore, there arises a further advantage that the rotational torque of the input gear which is required for rotating the idler gear can be reduced. Other functions will become apparent from preferred embodiments described below.

DETAILED DESCRIPTION OF THE PREFFERED EMBODIMENTS

Figure 1:
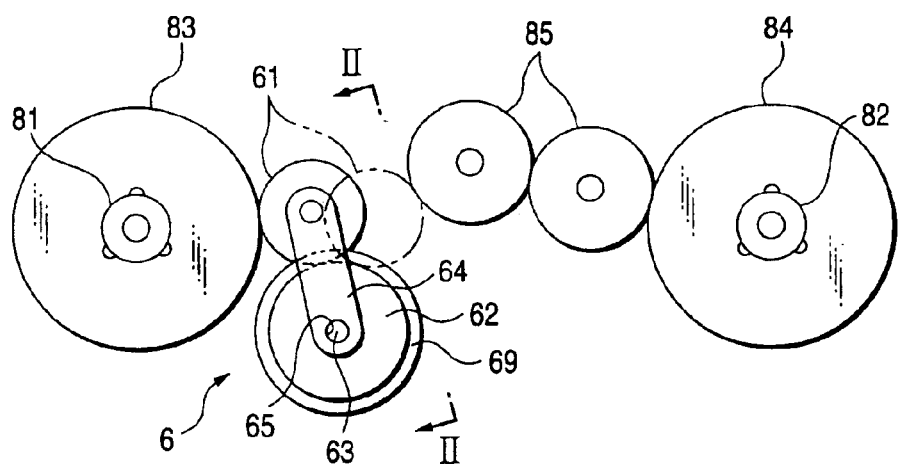
FIG. 1 is a plan view showing a configuration of a magnetic tape device in which an idler mechanism of the invention is used.
Figure 2:
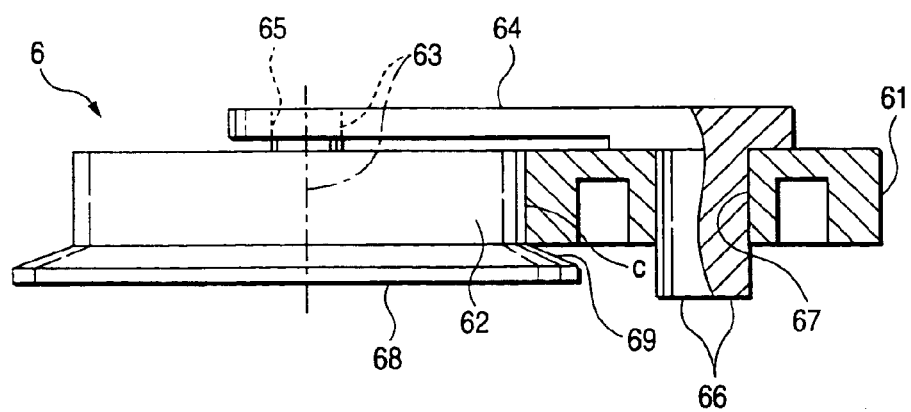
FIG. 2 is a partially cutaway enlarged side view of the idler mechanism, looking from a line II—II of FIG. 1.

FIG. 1 is a diagram showing the configuration of main portions of a magnetic tape device in which an idler mechanism 6 of a first embodiment of the invention is used. FIG. 2 is a partially cutaway enlarged side view of the idler mechanism 6, looking from a line II—II of FIG. 1.

Referring to FIG. 1, 81 and 82 denote reels. Gears 83 and 84 are disposed concentrically on the reels 81 and 82, respectively. The idler mechanism 6 is interposed between one of the gears, i.e., the gear 83, and a gear train 85. The gear train 85 meshes with the other gear, i.e., the gear 84. When an idler gear 61 of the idler mechanism 6 is located in a first position where the idler gear meshes with the one gear 83 as indicated by the solid line, rotation of the idler gear 61 is transmitted to the reel 81 via the gear 83. When the idler gear 61 of the idler mechanism 6 is located in a second position where the idler gear meshes with a gear of the gear train 85 as indicated by the phantom line, rotation of the idler gear 61 is transmitted to the reel 82 via the gear train 85 and the gear 84.

As shown in FIG. 1 or 2, an input gear 62 always meshes with the idler gear 61. When the input gear 62 is rotated forwardly or reversely, the idler gear 61 is rotated in the direction which is opposite to the rotational direction of the input gear 62. A center shaft 63 of the input gear 62 is fitted into a hole 65 which is formed in one end of an arm-like swinging member 64 in a relatively rotatable manner. A shaft 66 which protrudes downward is integrally formed on the other end of the swinging member 64 by a synthetic resin. The shaft 66 is inserted into a bearing hole 67 of the idler gear 61 in a relatively rotatable manner. As seen from FIG. 2, the shaft 66 is formed into a rod-like shape in which the diameter is uniform over the whole range in the axial direction.

A flange 68 is disposed on the lower end of the input gear 62. The flange is molded integrally with the input gear 62 and projects from the periphery of the input gear 62. A surface of the flange 68 is formed as a friction force applying face 69 which extends radially outwardly so as to be inclined downwardly. In one part in the circumferential direction of the friction force applying face 69, specifically, a meshing part "c" between the input gear and the idler gear, a lower end corner part of the outer peripheral portion of the idler gear 61 comes into contact with the friction force applying face 69. Therefore, the idler gear 61 is held in a space between the friction force applying face 69 of the input gear 62 and the swinging member 64. In this state, the flange 68 prevents the idler gear 61 from slipping off from the shaft 66. Consequently, the shaft 66 can be formed into a rod-like shape in which the diameter is uniform over the whole range in the axial direction, as described above.

In this embodiment, when the input gear 62 is rotated, the idler gear 61 is rotated in the direction which is opposite to the rotational direction of the input gear 62. Since the lower end corner of the outer peripheral portion of the idler gear 61 is in contact with the friction force applying face 69 of the input gear 62, a rotational torque for swinging the idler gear 61 between the first and second positions is generated by the frictional resistance generated in the contacting part. Therefore, the idler gear 61 is swingingly displaced about the center shaft 63 of the input gear 62 by the rotational torque. When the rotational direction of the input gear 62 is switched over to the forward or reverse direction, the idler gear 61 is swingingly displaced between the first position where the idler gear meshes with the gear 83 to transmit rotation to the one reel 81, and the second position where the idler gear meshes with the gear train 85 to transmit rotation to the other reel 82.

The lower end corner of the outer peripheral portion of the idler gear 61 which is located in the first or second position comes into point contact or line contact with the friction force applying face 69 of the input gear 62, in the meshing part "c" between the idler gear 61 and the input gear 62. Therefore, a situation in which the frictional resistance of the contacting part is unduly increased and an excessively large load is applied to the input gear 62 does not occur. Moreover, the rubbing between the friction force applying face 69 which is rotated together with the input gear 62, and the lower end corner of the outer peripheral portion of the idler gear 61 which is rotated in the same direction as the face is reduced, so that wear does not occur in the friction force applying face and the idler gear 61. This function will be enhanced by applying grease to at least one of the friction force applying face and the idler gear 61. Since rotation of the friction force applying face 69 is transmitted to the idler gear 61, there arises a further advantage that the rotational torque of the input gear 62 which is required for rotating the idler gear 61 via the meshing part "c" can be reduced.

In the above embodiment, the flange 68 having the friction force applying face 69 is disposed on the input gear 62. This configuration may be modified in the following manner. A flange having a friction force applying face may be disposed on the idler gear, and the input gear may slidably come into contact with the friction force applying face.

Figure 6:
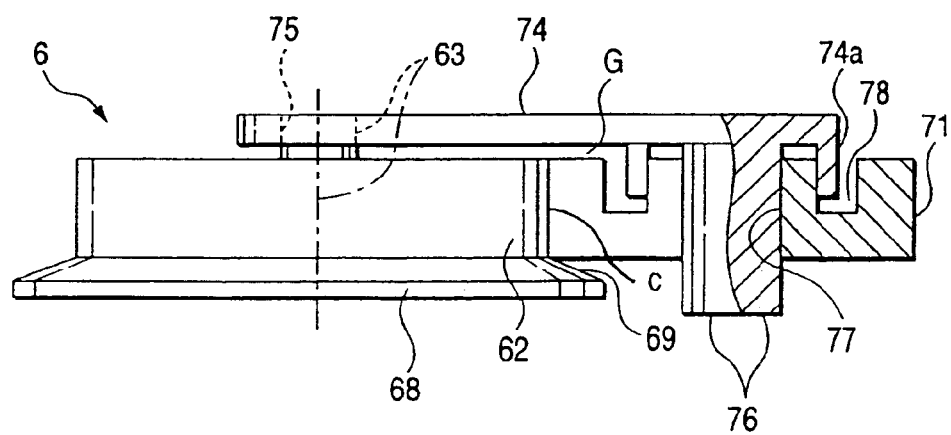
FIG. 6 is a partially cutaway enlarged side view of a second embodiment.

FIG. 6 shows a second embodiment of the present invention. An input gear 62 always meshes with an idler gear 71. When the input gear 62 is rotated forwardly or reversely, the idler gear 71 is rotated in the direction which is opposite to the rotational direction of the input gear 62. The structure of the input gear 62 is same as that of the first embodiment. A center shaft 63 of the input gear 62 is fitted into a hole 75 which is formed in one end of an arm-like swinging member 74 in a relatively rotatable manner. A shaft 76 which protrudes downward is integrally formed on the other end of the swinging member 74 by a synthetic resin. The shaft 76 is inserted into a bearing hole 77 of the idler gear 71 in a relatively rotatable manner. The shaft 76 is formed into a rod-like shape in which the diameter is uniform over the whole range in the axial direction.

In one part in the circumferential direction of the friction force applying face 69, specifically, a meshing part "c" between the input gear and the idler gear, a lower end corner part of the outer peripheral portion of the idler gear 71 comes into contact with the friction force applying face 69. In this state, a gap "G" is defined between an upper face of the idler gear 71 and a lower face of the swinging member 74.

A circumferential groove 78 is formed on the upper face of the idler gear 71. The circumferential groove 78 is concentric with the bearing hole 77 and surrounds the bearing hole 77.

A cylinder-like guide wall 74a is disposed on the lower face of the swinging member 74. One side face of the circumferential groove 78 and the guide wall 74a is engaging in a relatively rotatable manner. In this embodiment, an inner circumferential side face of the circumferential groove 78 and an inner circumferential face of the guide wall 74a is engaging in a relatively rotatable manner, with a lubricant such as grease is applied therebetween. Since a shearing resistance force of the grease is high, the swinging member 74 is surely swung.

Figure 7:
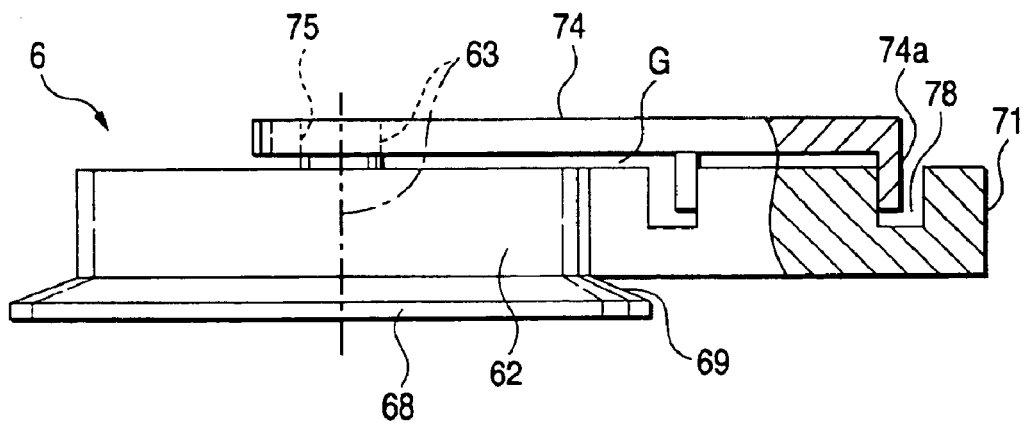
FIG. 7 is a partially cutaway enlarged side view of a third embodiment.

FIG. 7 shows a third embodiment of the present invention. In this embodiment, the shaft 76 described with reference to FIG. 6 is not disposed on a swinging member 74. Also, the bearing hole 77 described with reference to FIG. 6 is not formed in an idler gear 71. An inner circumferential side face of a circumferential groove 78 and an inner circumferential face of a guide wall 74a is engaging in a relatively rotatable manner, with a lubricant such as grease is applied therebetween.

Figure 8:
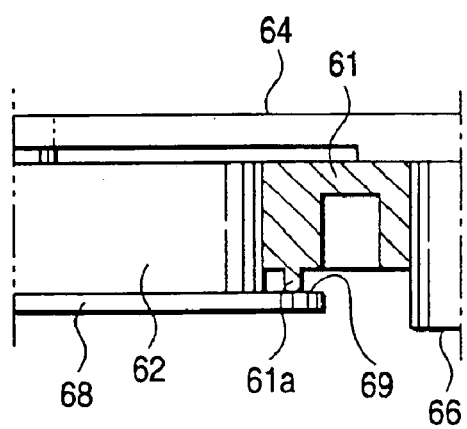
FIG. 8 shows a variation of the first embodiment.

The present invention is not limited to as herein described. In the first embodiment, the friction force applying face 69 is formed to be inclined downwardly. As shown in FIG. 8, a friction force applying face 69 may be formed as a flat face which extends in a horizontal direction. A projection 61a is formed on a lower corner part of the idler gear 61 so as to come into point contact or line contact with the friction force applying face 69.

Figure 9:
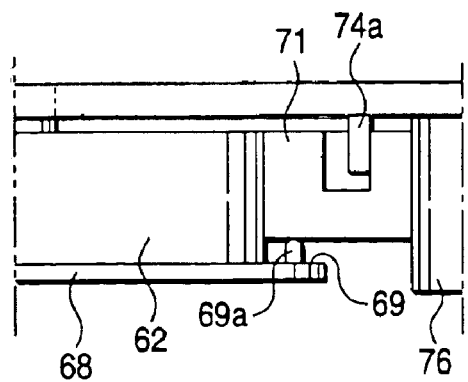
FIG. 9 shows a variation of the second embodiment.

In the second embodiment, the friction force applying face 69 is formed to be inclined downwardly. As shown in FIG. 9, a flange 68 may have a flat upper face which extends in a horizontal direction. A projection 69a is formed on the upper face of the flange 68 so as to come into point contact or line contact with a lower face of the idler gear 71.

Figure 3:
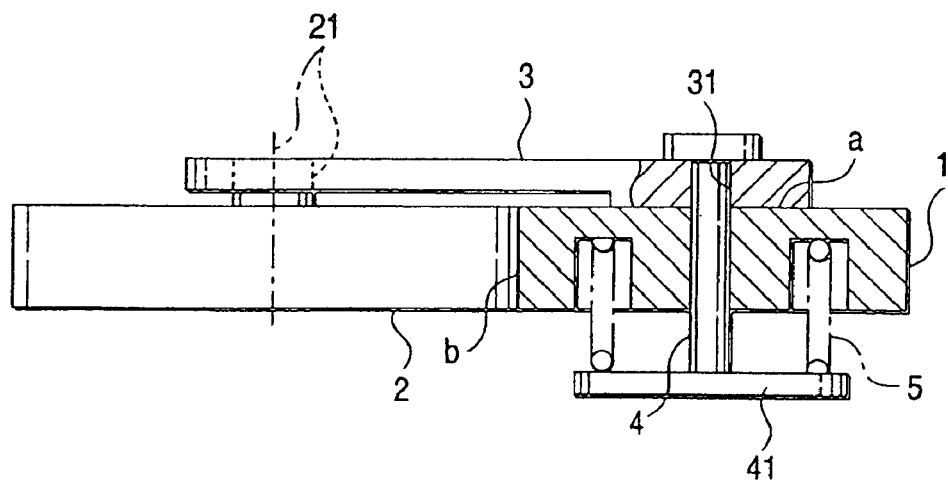
FIG. 3 is a partially cutaway side view of a conventional idler mechanism.
Figure 4:
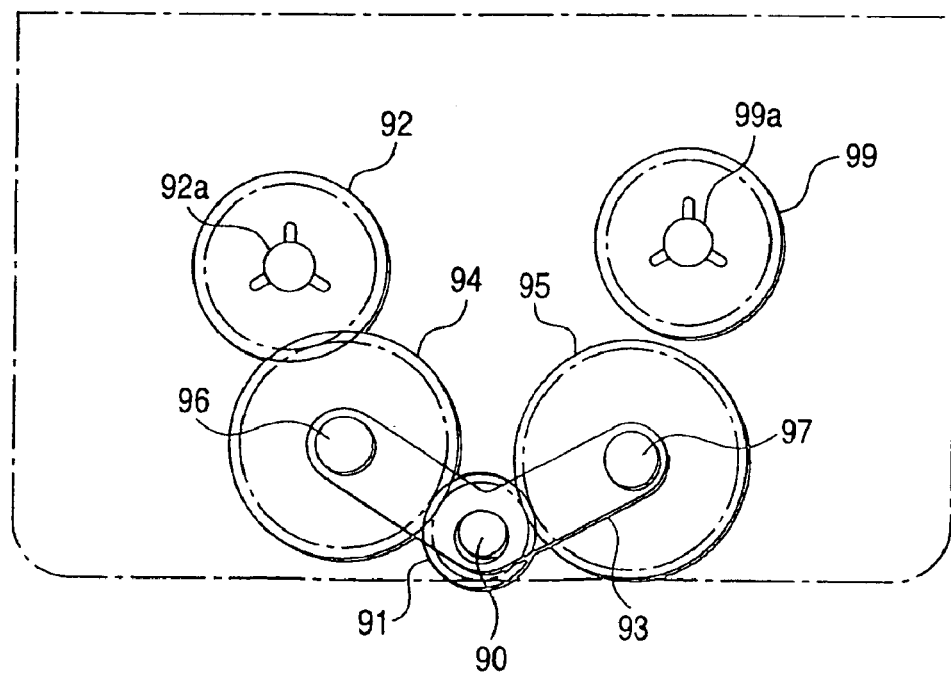
FIG. 4 is a plan view of a prior art.
Figure 5:
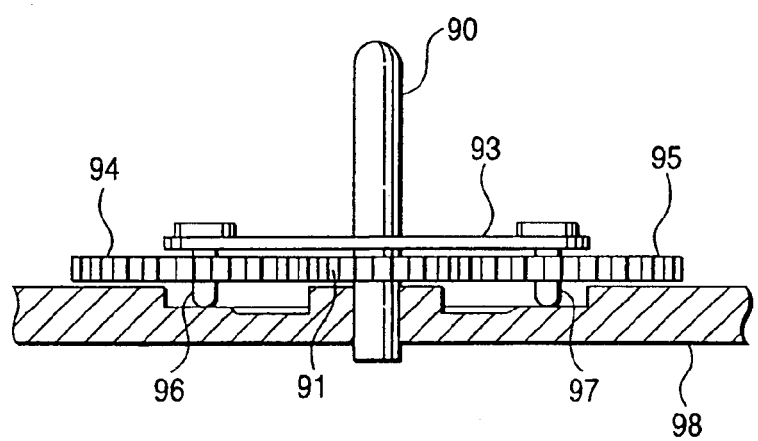
FIG. 5 is a front view of the prior art.

As described above, according to the invention, the number of parts can be reduced by eliminating the necessity of the spring and the shaft described with reference to FIG. 3. Hence, cost reduction due to the reduced number of parts can be easily realized. Moreover, wear in the contacting part between the friction force applying face and the input gear or the idler gear can be suppressed. Therefore, a magnetic tape device having the idler mechanism that maintains the initial performance stability for a long time period and preventing troubles such as disturbance of an image or skipping of sound from occurring can be produced economically and easily.

What is claimed is:

1. An idler mechanism for a magnetic tape device, comprising:
   a pair of reels;
   an idler gear swingingly displaced between first and second positions to selectively transmit rotation to one of the pair of reels, the idler gear having a bearing hole;
   an input gear meshing with the idler gear, the input gear having a center shaft that is rotated forwardly and reversely and a flange projecting from a periphery of the input gear;
   a swing member arm having one end coupled in a relatively rotatable manner to the center shaft, the swinging member having a shaft integrally formed with the swinging member on the other end and being inserted in a relatively rotatable manner into the bearing hole;
   wherein the flange comprises a friction force applying face, the friction force applying face being inclined and extending radially outwardly relative to the center shaft, and
   an outer peripheral portion of the idler gear that is held in a space between the friction force applying face and the swinging member slidably comes into contact with the friction force applying face in a part where the input gear meshes with the idler gear.

2. An idler mechanism for a magnetic tape device, comprising:
   a pair of reels;
   an idler gear swingingly displaced between first and second positions to selectively transmit rotation to one of the pair of reels;
   an input gear meshing with the idler gear and rotated forwardly and reversely;
   a swinging member coupled in a relatively rotatable manner to the idler gear and the input gear; and
   a friction force applying face comprising a flange projecting from the periphery of one of the idler gear and the input gear, wherein the other of the idler gear and the input gear slidably comes into contact with the friction force applying face.

3. The idler mechanism for a magnetic tape device according to claim 2, wherein the friction force applying face is formed by a surface of a flange that is integrally formed on the one gear, and
   an outer peripheral portion of the other gear slidably comes into contact with the friction force applying face.

4. The idler mechanism for a magnetic tape device according to claim 3, wherein the flange comprises a friction force applying face, the friction force applying face being inclined and extending radially outwardly relative to an axis of rotation of said one of the idler gear and the input gear.

5. The idler mechanism for a magnetic tape device according to claim 3, wherein the other gear comprises a bearing hole,
   the swinging member comprises a shaft which is inserted in a relatively rotatable manner into the bearing hole,
   the flange is projecting from a periphery of the one gear, and
   the other gear is held in a space between the friction force applying face and the swinging member.

6. The idler mechanism for a magnetic tape device according to claim 4, wherein the other gear comprises a bearing hole,
   the swinging member comprises a shaft which is inserted in a relatively rotatable manner into the bearing hole,
   the flange is projecting from a periphery of the one gear, and
   the other gear is held in a space between the friction force applying face and the swinging member.

7. The idler mechanism for a magnetic tape device according to claim 2, wherein the friction force applying face is formed by a surface of a flange that is integrally formed on the one gear, and
   an outer peripheral portion of the other gear has a projection that slidably comes into contact with the friction force applying face.

8. The idler mechanism for a magnetic tape device according to claim 2, wherein a flange is integrally formed on the one gear,
   the friction force applying face is formed by a projection formed on an upper face of the flange, and
   an outer peripheral portion of the other gear slidably comes into contact with the friction force applying face.

9. A tape device comprising:
   a pair of reels;
   an idler gear swingingly displaced between first and second positions to selectively transmit rotation to one of the pair of reels;
   an input gear meshing with the idler gear and rotated forwardly and reversely;
   a swinging member coupled in a relatively rotatable manner to the idler gear and the input gear; and
   a friction force applying face comprising a flange projecting from the periphery of one of the idler gear and the input gear,
   wherein the other of the idler gear and the input gear slidably comes into contact with the friction force applying face.

* * * * *